Nov. 24, 1936.                H. M. EDMUNDS                2,062,121
                              OVERSPEED SWITCH
                            Filed Feb. 18, 1936
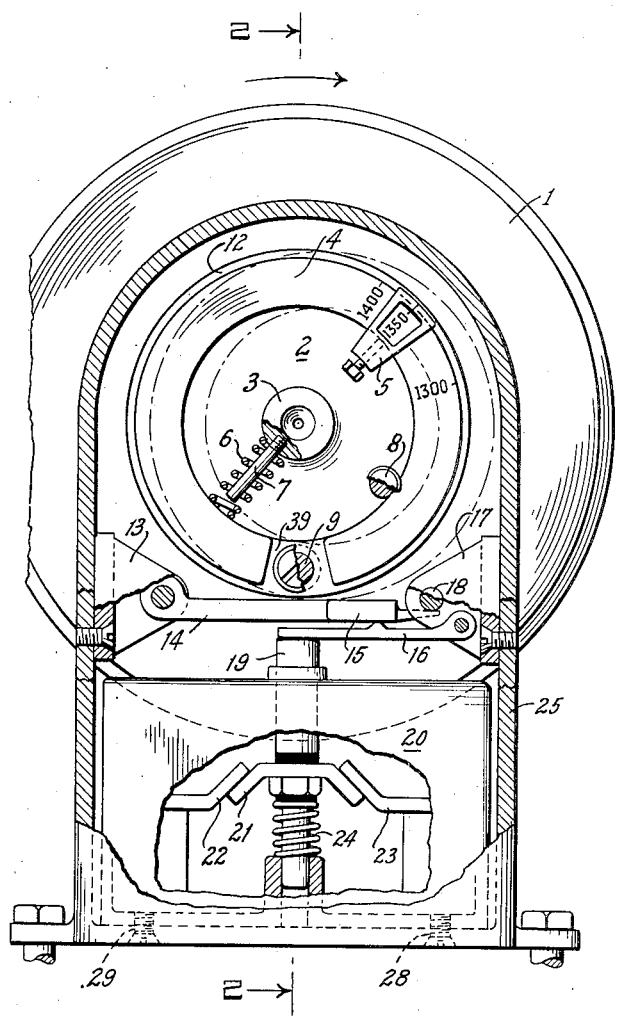
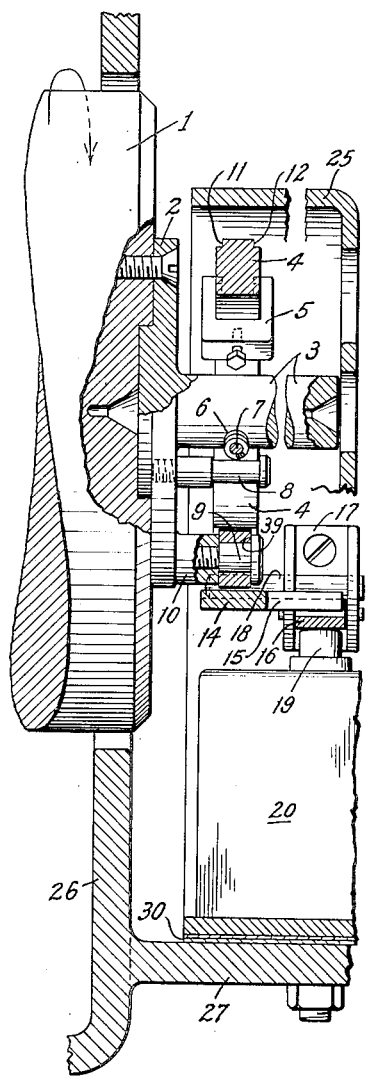
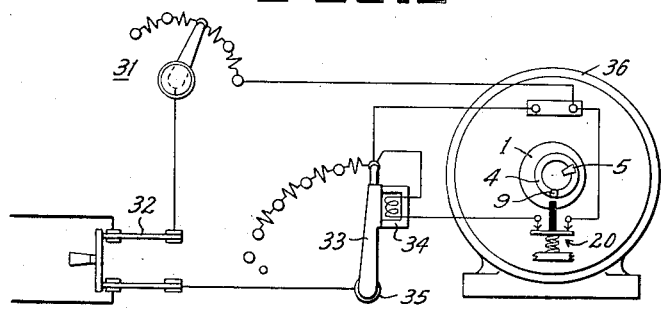
INVENTOR.
Howard M. Edmunds
BY Wm. J. Herdman
ATTORNEY.

Patented Nov. 24, 1936

2,062,121

UNITED STATES PATENT OFFICE 2,062,121

OVERSPEED SWITCH

Howard M. Edmunds, New York, N. Y., assignor to Crocker-Wheeler Electric Manufacturing Company, Ampere, N. J., a corporation of New Jersey Application February 18, 1936, Serial No. 64,451

5 Claims. (Cl. 200—80)

My invention pertains to electric switches and relates to that type of such devices which are automatically operated upon a predetermined condition of the mechanism with which they are associated.

In certain uses in which motive power is employed, it is essential that the rotor shall not exceed a certain predetermined speed. Numerous devices usually termed over-speed switches have been developed and used for insuring that the speed of rotors shall not exceed a predetermined limit, but all such devices as now known are difficult and expensive to manufacture in mass production, and difficult to accurately adjust with respect to the critical speed at which they operate. Further, it is often necessary that the over-speed switch shall operate quickly and within a narrow speed limit and with the present types of over-speed switches this cannot effectively be accomplished.

One of the principal objects contemplated by my invention is to provide an over-speed switch which, while simple and effective, may be easily and inexpensively manufactured in mass production.

Another object comprises producing a speed control switch which may be easily, quickly and accurately adjusted to operate at any critical speed.

Still another object of my invention comprises producing an over-speed switch which will operate quickly and within a narrow critical speed range.

A further object comprises producing an over-speed switch which, while easily and simply attached to a shaft, may be easily adjusted over a wide range of operative speeds and yet be employed with motors of any size.

A still further object comprises producing a speed control mechanism having a crisp and definite action and having a minimum variation of speed at which the action takes place.

I accomplish all of the above noted desirable objects and results by means of the novel combination, inter-relation and arrangement of parts which will be hereafter more specifically described with reference to the accompanying drawing forming a part of this specification and in which like reference numerals designate corresponding parts throughout.

In the accompanying drawing:

Fig. 1 is a partially sectioned, partially broken elevation of an embodiment of my invention;

Fig. 2 is a partially broken sectional view of the same taken on the line 2—2 of Fig. 1; and Fig. 3 is a schematic diagram of the electrical connections which may be employed in the use of my invention in connection with an electric motor.

Referring now to the drawing, and especially to Figs. 1 and 2, wherein is shown, by way of example, one embodiment of my invention especially useful in the speed control of electric motors. The shaft 1, which may be a motor shaft or other shaft rotated by a motor or other prime mover is preferably counterbored on the face of one extremity. A circular metallic plate 2 provided with a circular boss adapted to fit the counterbore in the shaft 1 and a centrally located stud 3 is secured to the shaft as shown by means of screws with the axis of the plate and stud coincident with the axis of the shaft. For convenience the extremity of the stud 3 is provided with a tapered counterbore for the admission of a tachometer or other speed indicating device. An annular metallic ring 4 is provided with a portion 39 of reduced thickness and the remaining portion provided near the peripheries of both sides with annular channels 11 and 12, the depth of each being such that the thickness of the ring 4 between the channels is the same as that of the reduced portion 39.

The circular plate 2 carries a threaded boss 10 to which the ring member 4 is pivoted by means of the shouldered pivot screw 9. The plate 2 further carries a stop-pin 8 so located with regard to the inner surface of the ring 4 that the ring 4 will normally be held against the stop-pin 8 in a balanced position with its geometric axis coincident with the axis of the shaft 1 by means of the compression spring 6 which is held in place by means of the pin 7 secured as shown in the stud 3. The spring 6 is normally compressed a certain degree and bears against the inner surface of the ring 4, as just explained, to insure that normally the ring 4 will be held against the stop-pin 8.

A weight 5 is formed as shown in the figures to slip on the ring 4 only at the portion of minimum thickness 39 of the ring and before the ring is pivoted in place, and may be secured at any desired position on the ring by means of the set screw as shown. When the shaft 1 is rotated in the direction indicated by the arrows without the weight 5, the ring 4 is normally balanced about its pivot point 9 and rotates concentrically with the shaft 1. With the weight in the position shown in Fig. 1, the ring member is unbalanced about its pivot point and when the rotation of the shaft carrying the ring 4 reaches a pre-determined speed the ring 4 is by centrifugal force thrown eccentric with the shaft 1. This eccentric motion is limited by means of the pin 7. The ring 4 therefore assumes a limited position shown in the dotted lines in Fig. 1. If the weight 5 is placed at a radial point at right angles to the pivot point 9 it will exert the greatest effect in unbalancing the ring member 4 and thus throw the ring 4 eccentric to the axis of shaft 1 at a lower speed. As the weight 5 is moved around the ring member 4 to the left as viewed in Fig. 1, the speed at which the ring member 4 is thrown into eccentricity with the axis of the shaft 1 increases until of course if the weight is placed diametrically opposite the pivot point 9 the ring member will again be balanced with respect to its pivot point and there will be no tendency during the rotation for the ring to assume a position eccentric to the axis of shaft 1.

A cover 25 is provided to enclose the mechanism and may be mounted on an extension 27 of the bearing housing 26 of the shaft 1. Pivot journals 13 and 17 are carried by the cover 25. A lever 14 is carried by pivot journal 13 with its upper surface adjacent to but normally out of contact with the ring member 4. An extension 15 on lever 14 bears against a fulcrum ridge on lever 16 which is pivoted in pivot journal 17 in which there is also provided stop-pin 18 to limit the upper motion of lever 14. The free end of lever 16 bears against the operating shaft 19 of an enclosed switch 20 carrying contacts 21, 22 and 23, contact 21 being carried by the operating shaft 19, and normally held against contacts 22 and 23 by spring 17. This switch is of a type well known and is held in the housing 25 by means of screws 28 and 29. Further there are provided shims 30, Fig. 2, by means of which to adjust the position of the extremity of the shaft 19 with respect to lever 16.

In the operation of my device, when the shaft 1 reaches a predetermined speed, the ring member 4 by reason of the weight 5 and the position thereof on the ring 4 is thrown into eccentricity with the shaft 1 and acts, in effect, like an eccentric cam to depress lever 14, the motion of which is multiplied by the lever 16 to depress the operating shaft 19 of switch 20 to break contact 21 with contacts 22 and 23.

The critical operating speeds may be designated upon the ring member 4 as indicia, as shown, and an index provided on the weight to assist in properly positioning the weight with respect to the selected operating speed indicia.

Obviously my device may be used in many ways to control the rotative speeds of many different classes of rotating shafts or prime movers. The switch 20 may obviously be of the type in which the contacts are normally open and are closed when the ring member assumes, at a predetermined speed, the required eccentricity with the rotating shaft, in which case the switch may be used to control relays or electrically operated valves to control the fuel throttles of gas engines, oil engines, steam turbines, or water power apparatus. It may also be used to control an electric motor, as shown for example in Fig. 3, which shows schematically the wiring diagram of an electric motor 36 fed from a switch 32 through an adjustable rheostat 31 and electric starter 33, the arm of which is held normally open by means of a coil spring 35. The shaft 1 of the motor carries the ring member 4 and weight 5 through the medium of which, when the motor shaft reaches a predetermined speed, switch 20 is opened to in turn open the holding coil 34 of the starting switch 33 to allow the same to open and disconnect the motor.

It will be clear from the foregoing that my invention provides an over-speed switch in which mass production or manufacture is facilitated and cheapened, as all of the parts including the switch can be standardized and used with motors of widely variant power and sizes and that it can be set to operate at any desired speed merely by changing the position of the weight 5 or substituting weights of different sizes or springs of variant tensions.

It will be further noted that my device operates positively, quickly and crisply and in a narrow speed range as repeated tests have conclusively determined, for as soon as the critical speed is reached at which the centrifugal force overcomes the spring reaction, the complete outward movement of the ring occurs without any increase of speed, because the centrifugal force increment for a given ring movement is in my device greater than the spring reaction increment.

Obviously, instead of employing movable weights to unbalance the ring, holes may be bored in the ring member 4 to accomplish the same purpose. I prefer, however, to use weights as these may be made of variant sizes and interchangeable to easily achieve a wide variation in operative speeds. By means of calibrated speed indicia on the ring member 4, critical adjustments of the operating speed may be readily attained.

While I have shown and described an embodiment of my device in which the device is attached to or mounted on the end of a shaft, it will be apparent that it is not necessary to so mount the device. The device may, of course, be mounted at any place on the shaft and if mounted at a point intermediate the ends of the shaft, the plate member 2 is, of course, designed in the form of an annular ring to encircle the shaft and may be then attached to the shaft in any convenient or desirable manner.

In the operation of my device, the eccentric cam action of the ring member 4 in operating the system of levers and the switch occasions considerable noise. This is an advantage as it warns the operator of the operation of the device. If desired, this noise as an audible signal may be increased by roughening the surface of the annular ring, providing a gong which the ring may strike, or by attaching a sounding board to the cover member 25. Further, the switch 20 may be of the type in which one contact is normally open and the other normally closed and the normally open contact may be closed to operate bells or other audible or visual signals for warning purposes.

It will be obvious from the foregoing that my device is simple and effective and may be easily and inexpensively manufactured in mass production; that the operative speed may be easily, quickly and accurately adjusted; that the device will operate positively, quickly and crisply and within a narrow critical speed range; and that it may be easily adjusted over a wide range of operative speeds and be employed in connection with rotors of any size.

Although I have shown and described, by way of example, only one embodiment of my invention, it will be apparent that various changes may be made therein without departing from the intended scope and spirit of the invention. I do not, therefore, desire to limit myself to the foregoing except as may be pointed out in the appended claims in which I claim:

1. A speed control device comprising, a shaft adapted to rotate, a member pivoted to rotate with said shaft, the mass of said member being uniformly and symmetrically distributed with respect to the point of pivot thereof whereby said member is balanced with respect to said shaft, a stop pin, means holding said member normally against said stop pin with the geometric axis of said member co-incident with the axis of said shaft, means for unbalancing and adjusting the degree of unbalance of said member about the pivot point thereof, and a speed controlling mechanism adapted to be operated by said member when said member during the rotation thereof has by centrifugal force because of the unbalance thereof been moved a predetermined degree about the pivot point thereof.

2. An over-speed device comprising, a shaft adapted to rotate, a supporting member attached to said shaft, a movable member in the form of a ring pivotally attached to said supporting member, means for holding the geometric axis of said movable member normally coincident with the axis of said shaft, a weight on said movable member, said weight being adjustable in position on said movable member to predetermine the center of gravity of said movable member whereby when the rotation of said shaft reaches a predetermined speed, said movable member is caused to rotate about the pivot point thereof against the pressure exerted by said holding means and a speed controlling mechanism adapted to be operated when the motion of said movable member about said pivot point reaches a predetermined degree.

3. An over-speed device comprising, a shaft adapted to rotate, a member pivoted to rotate with said shaft, a stop-pin, means normally holding said member against said stop-pin, a weight supported by said member and adapted to unbalance said member about the pivot point thereof so that as said shaft rotates said member is, by centrifugal force, moved about the pivot point thereof, a speed controlling mechanism adapted to be operated by said member when said member during the rotation thereof has moved a predetermined degree about the pivot point thereof, and indicia on said member whereby said weight may be adjustably positioned on said member to predetermine the rate of speed of said shaft at which said speed controlling mechanism is operated.

4. An over-speed switch comprising, a shaft adapted to rotate, a supporting member attached to said shaft, a movable member pivotally attached to said supporting member, means for holding the geometric axis of said movable member normally coincident with the axis of said shaft, a weight on said movable member, said weight being movable to adjust the center of gravity of said movable member whereby when the rotation of said shaft reaches a predetermined speed said movable member is caused to rotate about the pivot point thereof against the pressure exerted by said holding means, a switch adapted to be operated when the motion of said movable member about said pivot point reaches a predetermined degree, and indicia on said movable member whereby said weight may be adjustably positioned on said member to predetermine the rotative speed of said shaft at which said switch is operated.

5. An over-speed switch comprising, a shaft adapted to rotate, a movable member pivoted to rotate with said shaft, a stop-pin, means normally holding said movable member against said stop-pin, a weight supported by said movable member and adapted to unbalance said member about the pivot point thereof so that as said shaft rotates said movable member is, by centrifugal force, moved about the pivot point thereof, a system of levers, one of which is positioned adjacent but normally out of contact with said movable member, an enclosed push-switch, the operating shaft of which is positioned adjacent to one of said levers, said system of levers being adapted to be operated by said movable member to multiply the motion of said member to depress said switch shaft when said movable member during the rotation thereof has moved a predetermined degree about the pivot point thereof, and indicia on said movable member whereby said weight may be adjustably positioned on said member to predetermine the rotative speed of said shaft at which said switch is operated.

HOWARD M. EDMUNDS.